United States Patent

[11] 3,596,767

| [72] | Inventor | Ronald L. Antonie<br>Milwaukee, Wis. |
|---|---|---|
| [21] | Appl. No. | 798,381 |
| [22] | Filed | Feb. 11, 1969 |
| [45] | Patented | Aug. 3, 1971 |
| [73] | Assignee | Autotrol Corporation<br>Glendale, Wis. |

[54] SEWAGE TREATMENT APPARATUS
1 Claim, 1 Drawing Fig.

[52] U.S. Cl............................................. 210/96,
   210/6, 210/17, 210/97, 210/195
[51] Int. Cl............................................. C02c 1/10
[50] Field of Search.................................... 210/3—8,
   15, 17, 96, 97, 194—197; 137/3, 7, 12

[56] References Cited
UNITED STATES PATENTS

| 2,154,132 | 4/1939 | Mallory........................ | 210/7 |
| 3,335,081 | 8/1967 | El-Naggar.................... | 210/15 |
| 3,428,554 | 2/1969 | Dye............................. | 210/4 |

FOREIGN PATENTS

| 935,162 | 8/1963 | Great Britain................ | 210/17 |

OTHER REFERENCES

Garrison, W. E., et al., Operation of the Whittier Narrows Activated Sludge Plant, Water and Sewage Works, Reference Number pp. R-189 thru R-192, R-194 thru R-196 and R-198 thru R-200 (copy in GP. 176)

Schaffer, R. B., et al., Application of a Carbon Analyzer in Waste Treatment, Journal WPCF, Nov. 1965, Vol. 37, pp. 1545 and 1553 thru 1566, relied on (copy in P.O.S.L.)

*Primary Examiner*—Michael Rogers
*Attorneys*—Thomas W. Ehrmann and Allen W. Leiser ABSTRACT: A sewage treatment apparatus and method comprising a biological treatment tank, preferably including rotatable biological contactor means therein. Means are provided for sensing the hydraulic flow rate in the system and also for sensing the organic concentration of the sewage or of the effluent, and for recycling secondary sludge to the biological treatment tank as a function of the hydraulic flow rate and of the organic concentration.

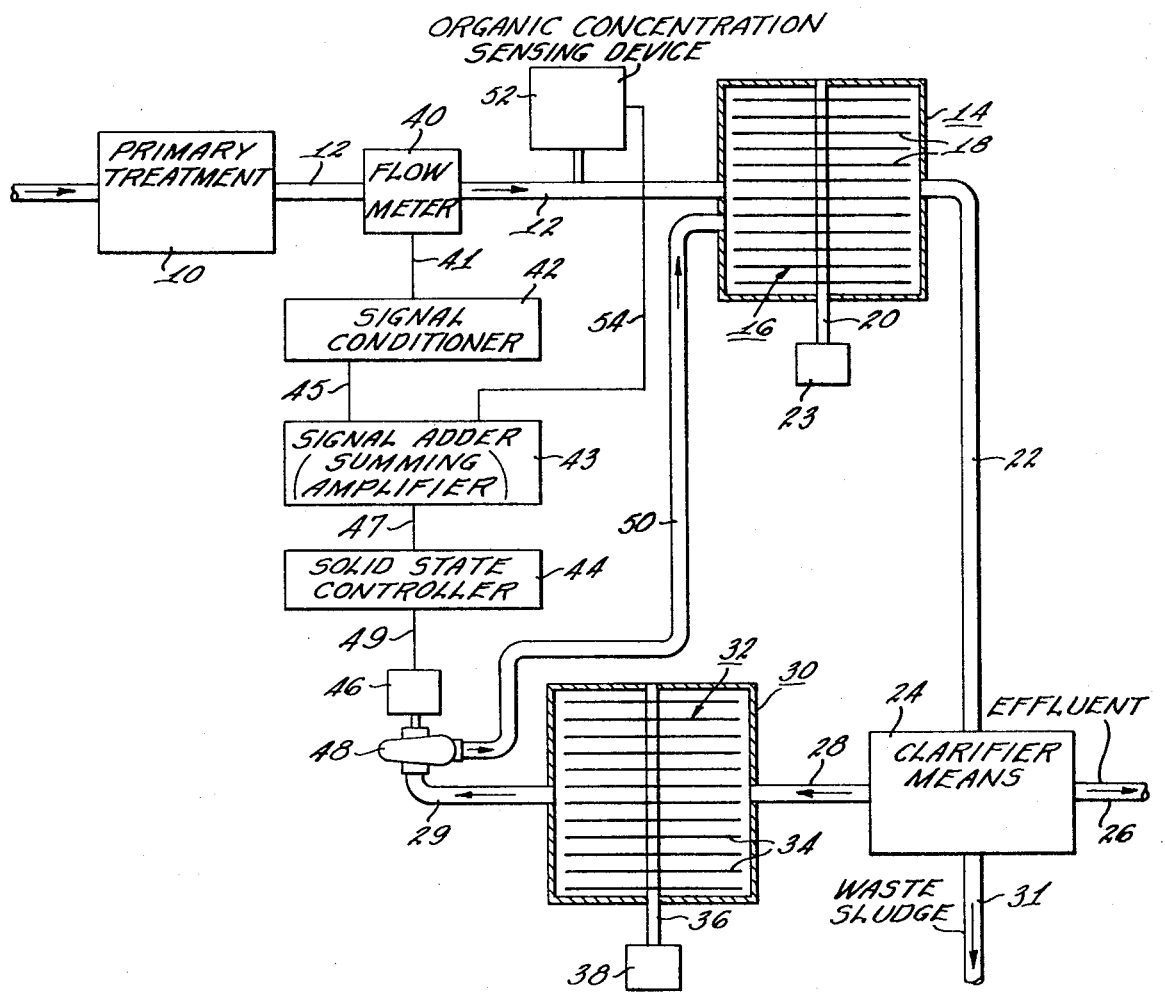

SEWAGE TREATMENT APPARATUS

BACKGROUND OF THE INVENTION

1. Field of the Invention

This invention relates to a sewage treatment apparatus and method and more particularly to a sewage treatment apparatus and method utilizing a biological treatment apparatus and step, such as a rotating biological contactor or the like.

2. Description of the Prior Art

It is known in the art of sewage treatment to utilize in the secondary or biological treatment step what may be referred to as a "rotating biological contactor" including a rotating member which is covered with aerobic bacterial slime and which is rotated so as to bring the biological slime on the rotating member alternately into contact with the sewage being treated and with an oxygen-containing atmosphere.

One example of a rotating biological contactor is shown, for example, by U.S. Pat. No. 2,433,884 issued to J. G. Bevan on Jan. 6, 1948.

A preferred form of rotating biological contactor is shown by British Pat. No. 935,162 to Hans Hartmann, published Aug. 28, 1963, which shows the use of a plurality of disk members extending parallel to the direction of sewage flow and mounted on a horizontal shaft which extends transverse of the direction of sewage flow. The disk members are coated with a bacterial film, and are rotated into alternate contact with atmospheric oxygen and with the sewage or mixed liquor to be treated. The bacterial slime on the rotating disks consists principally of aerobic bacteria which have the ability to absorb, adsorb, coagulate and oxidize the undesirable organic constituents of the sewage and to change such constituents to unobjectionable forms of matter. The presence of the biological film or slime on the rotating disks also greatly increases the transfer of oxygen to the sewage through which the disks rotate, thereby promoting the multiplication or synthesis of the aerobic bacteria already present in the mixed liquor and in the bacterial film, as well as increasing the ability of the aerobic bacteria to act upon the sewage and reduce it to unobjectionable forms.

When the micro-organisms in the rotating biological contactor treatment step are adequately aerated, the waste degradation efficiency depends on the sewage or "food" to micro-organism ratio. During periods of high loading, the sewage to micro-organism ratio is increased and a lower degradation efficiency results.

The efficiency of treatment in the biological treatment tank is influenced by both the concentration of waste materials and the flow rate. The organic load on the biological treatment device or apparatus is the product of the organic concentration and the flow rate. It is desirable to maintain a substantially constant ratio between organic waster materials and micro-organisms.

As pointed out in U.S. Pat No. 2,118,266 issued to Carl H. Nordell on May 24, 1938, which deals with the same problem as the present application but utilizing a different apparatus and method, in all sewage treatment systems the amount of sewage to be treated and the strength or concentration of the sewage is subject to very considerable fluctuations. Rainstorms cause considerable changes of volume and strength in the case of combined surface water an sewage systems. Changes in volume and strength occur periodically. Thus, during any 24-hour period the strength of sewage varies within very wide limits. During the night and early morning, the incoming flow may be mainly water which drains from the ground into the sewers.

In the forenoon the amount of excreta collected by the system may attain peak proportions. Another factor which may give a peak load of short duration is the delivery of trade or industrial wastes into the sewage system.

SUMMARY OF THE INVENTION

Accordingly, it is an object of the present invention to provide an apparatus for and method of treating sewage as a function of the conditions and characteristics of the sewage flow.

It is another object of the invention to provide an apparatus for and method of treating sewage as a function of the hydraulic flow rate of the material flowing in the system.

It is a further object of the invention to provide an apparatus for and method of treating sewage as a function of the organic concentration of the input sewage flow to the biological treatment tank or of the output effluent from the clarifier means.

It is a further object of the invention to provide an apparatus for and method of treating sewage in accordance with which secondary sludge is recycled to the biological treatment tank as a function of both the organic waste concentration and the hydraulic flow rate, whereby to maintain a substantially constant ratio between organic waste materials and micro-organisms.

It is a further object of the invention to provide an apparatus for and method of treating sewage utilizing a biological treatment apparatus and/or step such as a rotating biological contactor, in which the degree of biological treatment and the supply of micro-organisms in the biological treatment step are regulated or adjusted as a function of both the hydraulic flow rate and organic concentration of the flow.

In achievement of these objectives, there is provided in accordance with this invention a sewage treatment apparatus and method comprising a biological treatment tank, preferably including rotatable biological contactor means therein, with means being provided for sensing the hydraulic flow rate in the system and for sensing the organic concentration of the sewage or of the effluent and for recycling secondary sludge to the biological treatment tank as a function of the hydraulic flow rate and of the organic concentration measured.

BRIEF DESCRIPTION OF THE DRAWING

Further objects and advantages of the invention will become apparent from the following description taken in conjunction with the accompanying drawing in which the sole finger is a schematic diagram of a sewage treatment apparatus and method in accordance with the invention

DESCRIPTION OF THE PREFERRED EMBODIMENT

Referring now to the drawing, there is indicated a sewage system including a primary treatment step in which untreated raw sewage is fed into a settling tank 10 or the like which permits settling of solids, grit and the like to the bottom of the settling tank. Prior to entering the settling tank, the sewage is conventionally subjected to screening and in some cases to comminution.

What may be referred to a primary treated raw sewage emerges from the primary treatment or settling tank 10 and passes through the conduit or passage 12 to the tank or basin 14 in which a biological treatment means in the form of a rotating biological contactor assembly generally indicated at 16 is mounted for rotation. The upper portion of tank 14 above the mixed liquor therein is exposed to an oxygen-containing atmosphere. The rotating biological contactor assembly 16 comprises a plurality of disks 18 mounted on a horizontal shaft 20. Disks 18 extend parallel to the direction of sewage flow and rotate in vertical planes. The level of the mixed liquor in the tank 14 is maintained substantially at the height of shaft 20, so that as each disk 18 rotates it is immersed to substantially one-half of its diameter in the mixed liquor, while the upper half of the diameter of the disk is rotating through the oxygen-containing atmosphere above the level of the mixed liquor. The rotating biological contactor assembly 16 may be of the type shown in British Pat. No. 935,162 previously referred to, and the disks 18 are covered with a bacterial slime which adsorbs, absorbs, coagulates and oxidizes the mixed liquor in tank 14.

The shaft 20 is rotated by a suitable variable speed drive device 23 which may include a variable speed motor, such as a direct current motor connected to shaft 20 through a constant ratio gear reduction so that the rate of rotation of disks 18 may be varied as desired. The disk diameter may vary, for example, from 3 feet to 20 feet in diameter, and the speeds of rotation may vary from 0.5 r.p.m. to 40 r.p.m. Large diameter disks would generally be rotated at slower speeds than small diameter disks. These values are given by way of example only.

The mixed liquor is discharged from the biological treatment tank 14 and passes through conduit 22 to a clarifier means such as a settling tank 24. In the clarifier or settling tank 24 there occurs a final settling-out of the biological solids created in the biological treatment tank 14, to produce secondary sludge, and leaving a liquid effluent which is discharged from the settling tank 24 through the conduit 26. A portion of the biologically active secondary sludge passes outwardly from the clarifier or settling tank 24 through a conduit 28 to a reactivation or conditioning tank generally indicated at 30. Any excess secondary sludge which is not passed through the conduit 28 to the reactivation tank 30 is passed through the conduit 31 to a suitable discharge point.

Reactivation unit 30 includes a two-phase contactor device generally indicted at 32, including disks 34 mounted on a horizontal shaft 36 and driven by a suitable variable speed drive device 38 which may be similar to variable speed device 23. The two-phase contactor including the disks 34 mounted on shaft 36 may be mechanically similar to the rotating biological contactor generally indicated at 16 which rotates in tank 14, except that the rotatable two-phase contactor 32 in the reactivation or rejuvenation unit 30 performs principally an aeration function, and does not necessarily have a biological slime thereon as in the case of the rotating biological contactor 16.

If a rotating two-phase contactor 32 is used to aerate the secondary sludge, the sludge level in tank 30 is preferably maintained at an optimum level such that the rotating disks are maintained substantially half immersed in the sludge, with the upper half of each disk being exposed to an oxygen-containing atmosphere. Two-phase contactor devices are shown, by example, by U.S. Pat. Nos. 3,266,786—Grimes et al.; 3,294,378—Grimes; 3,305,224—Piotrowski; 3,325,134—McDonnell; and 3,348,829—Grimes. Any other suitable type of aerating device may be used in the reactivation or rejuvenation tank 30 instead of the rotatable two-phase contactor 32. For example, other types of aerating devices are shown by U.S. Pat. Nos. 3,348,829—Stott et al.; 2,328,655—Lannert; 2,555,201—Nordell; 3,101,321—Austin et al.; 3,109,875—Schramm et al.; and 3,232,866—Morgan.

As will be explained more fully hereinafter, the reactivation unit 30 serves as a storage tank or reservoir for the biologically active and rejuvenated activated sludge. The activated sludge is pumped from the tank 30 through conduit 29 by pump 48 in response to hydraulic and organic conditions of the flow in the sewage system and apparatus. The discharge side of pump 48 is connected by conduit 50 directly to treatment tank 14 so as to discharge secondary sludge into tank 14. In the schematic diagram in the drawing, a flow meter 40 is shown installed in hydraulic flow rate measuring relation in the sewage inlet conduit 12 to tank 14. Flow meter 40 continuously monitors the hydraulic flow rate in the system. The flow rate can be expressed in quantity or volume of flow per unit time, such as gallons per minute, gallons per hour, or gallons per day, for example. The location of flow meter 40 is not critical and flow meter 40 could be installed at other places in the flow system such as in conduit 22 between biological treatment tank 14 and the settling tank 24, or in the effluent conduit 26. The hydraulic flow rate in any of the possible locations of flow meter 40 just mentioned is substantially the same since the volume of secondary sludge is not significant insofar as the total hydraulic flow is concerned, and hence for purposes of obtaining a reading of the hydraulic flow rate in the system flow meter 40 may be positioned in an of the alternative positions just mentioned. If desired, compensating adjustments can be made to the flow meter and its associated equipment to compensate for any slight differences in the flow rate between the is possible flow meter location just mentioned. Flow meter 40 is connected by conductor means 41 to a signal conditioner 42 which in turn feeds an output signal into a signal adder 43. The signal adder, as will be explained, also receives a signal from the organic sensing device 52 to be described and adds the signal conditioner 42 of the flow meter 40 and from the organic sensing device 52 and transmits a resultant signal by conductor means 47 to the solid state speed controller indicated at 44 which is connected to pump motor 46 by conductor means 49. Controller 44 controls the speed of pump motor 46 in accordance with the resultant signal transmitted by the signal adder or summing amplifier 43 to the solid state or other suitable motor speed controller 44. As the speed of pump motor 46 varies, the seed and consequently the output of pump 48 varies.

As examples of a flow meter 40 and associated signal conditioner 42 which may be used, reference is made to the following publications:

(1) a magnetic meter flow as described in bulletin E-10 published Feb. 1967, by the Foxboro Company, Neponset Ave., Foxboro, Mass. This publication also describes on page 6 thereof Model 696 Magnetic Flow-to-Current Converter, which may be used as a signal conditioner 42 in association with the flow meter described in the same bulletin.

(2) Bulletin 10–05 -Robertshaw Controls-Instrumentation- which describes on page 7 thereof Model 7100—7200 Robertshaw-Brooks Electromagnetic Flowmeter and also on the same page describes Model 7400 Robertshaw-Brooks Electromagnetic Flowmeter Transmitter which may be used as a signal conditioner 42.

(3) A suitable magnetic flow meter for use as flow meter 40 is described on pages 28—29 of "Condensed Catalog" of Fischer and Porter Company, Warminster Pennsylvania Catalog 163, Publication 14324a, June, 1963.

A suitable signal converter for use as an associated signal conditioner 42 is described in specification 50ED3000, published by Fisher and Porter Company, Publication 16284, July 1967. Thus, if there is a large increase in the hydraulic flow rate in the flow system where flow meter 40 is installed, due to a storm condition, for example, an electrical signal will be provided from flow meter meter 40 to signal conditioner 42, and thence to signal adder 43 and to motor speed controller 44 which will increase the speed of pump motor 46 to increase the rate at which the biologically active secondary sludge is pumped by pump 48 from the conditioning and storage tank 30 through conduit 50 into biological treatment tank 14. On the other hand, if the rate of the hydraulic flow in the system diminishes the speed of pump 48 will be decreased as a function of the diminished hydraulic flow rate to diminish the rate at which the secondary sludge is pumped from tank 30 through conduit 50 into biological treatment tank 14.

An organic concentration sensing device 52 is provided in sensing relation to the sewage flow in the inlet conduit 12 to tank 14 or alternatively in the effluent conduit 26 from clarifier means 24 to continuously measure the organic concentration of the sewage in conduit 12 or in the effluent conduit 26 and to correspondingly regulate the flow of activated sludge to treatment tank 14 from storage tank 30 as a function of the organic concentration of the sewage in conduit 12 or in the effluent conduit 26. Thus, for example, the organic concentration sensing device 52 may be any one of the following types:

(1) Sensing device 52 may be a total carbonaceous analyzer which measures which measures the carbon content of the material flowing through conduit 12 or in effluent conduit 26 as an indication of the concentration of biodegradable organic material in conduit 12 or in effluent conduit 26. This may be an analyzer of the type described in Bulletin 4059–A of Beckman Instruments, Inc. Scientific and Process Instruments Division, Fullerton, California; or a Union Carbide total carbon analyzer Model 1212 as described in a brochure published by Union Carbide Corporation, Instruments Department, Electronics Division, 5 New Street, White Plains, New York; or a total organic carbon analyzer for waste samples, Leco No. 634—900 as described in form (157A published by Laboratory Equipment Corp., 1415 Hilltop Road, St. Joseph Michigan (2) Sensing device 52 may be a total oxygen demand analyzer which measures the material flowing in either inlet conduit 12 or in effluent conduit 26 which can be oxidized by the presence of oxygen, such as carbonaceous materials, sulphur, and nitrogen compounds. An analyzer of this type is described in the publication entitled "Ionics Model 225 -- Total Oxygen Demand Analyzer," published by Ionics Incorporated, 65 Grove Street, Watertown, Massachusetts.

(3) Sensing device 52 may be a chemical oxygen demand analyzer which measures all significant organic materials present in the flow through conduit 12 or alternatively in effluent line 26 to provide an indication of the concentration of organic material present. An analyzer of this type is manufactured by Technicon Controls, Inc., Ardsley (Chauncey), New York as described in brochure 1428 -6, Copyright (C) 1966 by Technicon Instruments Corporation.

The organic concentration sensing device 52 which may be any one of the types just described, continuously monitors the organic concentration in inlet conduit 12 or in effluent conduit 26 and provides an electrical output signal which is fed by conductor 54 to the signal adder or summing amplifier 43 where it is added to the signal from the flow meter 40 and flow meter signal conditioner 42 previously described, with the resultant signal being fed to the solid state controller 44 to control the speed of pump motor 46 and thus control the speed of pump 48.

It will thus be seen that the solid state controller 44 which controls the speed of the pump motor 46 and of the pump 48 is controlled as a function of the combined signals from the signal conditioner 42 of flow meter 40 and from the organic sensing device 52, with these two signals being respectively delivered by conductor means 45 and 54 to the signal adder 43 where the two signals are added and the resultant signal is fed to the solid state controller 44 for controlling the speed of pump motor 46 and hence the pumping rate of the pump 48.

The zoogloea including the aerobic bacterial and other biota which constitute the secondary sludge when introduced into the biological treatment tank 14, add to the bacterial population which acts on the sewage therein the further absorb, absorb, coagulate and oxidize the organic impurities contained in the mixed liquor.

Suitable liquid level control means, not shown, may be provided for preventing further flow of secondary sludge through conduit 28 into tank 30 when the sludge level in that tank reaches the optimum level for proper aeration, after which all of the secondary sludge passes through the outlet conduit 31 of the settling tank 24 to a suitable discharge point until the sludge level n tank 30 drops below the optimum level, at which time sludge flow through conduit 28 to tank 30 will again resume.

It can be seen from the foregoing that means are provided for continuously adjusting the flow of secondary sludge to the biological treatment tank 14 as a function of the hydraulic flow rate in the system and also as function of the organic concentration of the input to the biological treatment tank or of the organic concentration of the effluent from the clarifier, whereby to maintain a substantially constant food to micro-organism ratio. Thus, during periods of large hydraulic flow rates sensed by the flow meter 40, as for example, under storm conditions, secondary sludge is introduced at an increased rate into treatment tank 14 as a function of the large hydraulic flow rate to compensate for the high rate of hydraulic flow, while during periods of low hydraulic flow rates, the flow rate of the secondary sludge to the treatment tank 14 is reduced as a continuous function of the lower hydraulic flow rate. Also, the organic concentration sensing device 52 insure that the flow of secondary sludge to the treatment tank 14 is a continuous function of the organic concentration of the sewage flow through conduit 12, or alternatively in the effluent conduit 26, whereby during periods of high organic concentrations the rate of flow of secondary sludge to tank 14 is correspondingly adjusted as a function of the high organic concentration while during periods of low organic concentrations a rate of flow of secondary sludge to the treatment tank is provided which is a function of the low organic concentration. The flow of secondary sludge to treatment tank 14 through conduit 50 is thus a combined function of the hydraulic flow rate sensed and of the organic concentration sensed. Thus, the secondary sludge is recycled to the treatment tank 14 as a function of the organic loading on the biological treatment means in tank 14, since the organic loading is the product of the organic concentration and the hydraulic flow rate.

In sensing or measuring the organic concentration in conduit 12, it will be understood that sensing device 52 is measuring the degree of impurity of the primary treated raw sewage being admitted to biological treatment tank 14. On the other hand, when sensing device 52 is located in or connected to effluent conduit 26, device 52 is measuring the degree of impurity of the effluent nd thus is measuring the effectiveness of the sewage treatment. Either measurement just mentioned (of the primary treated raw sewage or of the effluent) can be sued as an organic concentration signal for regulating the amount of secondary sludge which should be recycled through conduit 50 to the input of biological treatment tank 14 as a function of the organic concentration.

It will also be understood that the sensing devices 40 and 52 for sensing the hydraulic flow rate and organic concentration provide a continuous 24 hours-a-day monitoring of these conditions and provide signals which continuously control the flow of recycled secondary sludge through conduit 50 to the input of biological treatment tank 14.

While the signals from the sensing devices 40 and 52 are described and illustrated as being used to control the flow of recycled secondary sludge through conduit 50 by controlling the speed of the pump 48, it is also within the contemplation of this invention that other means might be used to control the flow of secondary sludge. For example, the signals from sensing devices device 40 and 52 might be used to vary the degree of opening of an adjustable valve in conduit 50 to control the flow of secondary sludge through conduit 50 to treatment tank 14. In such case, a suitable pump might be provided upstream of the adjustable valve to provide a constant pressure head against the adjustable valve.

While it is preferred to interpose the conditioning tank or reactivation tank 30 in the flow line between the settling or clarifier tank 24 and the input to the treatment tank 14, in order to provide a storage unit which always has a supply of secondary sludge available and thus makes possible a higher overload handling capacity, it is also within the scope of this invention to directly connect the sludge discharge conduit 28 of the clarifier tank 24 to the input of the biological treatment tank 14 without the use of a storage or reactivation tank 30 in the flow line. In such modified arrangement, the pump 48 whose operation is controlled by the sensing devices previously described is interposed in the flow conduit 28 from the clarifier means or settling tank 24 to the input of the biological treatment tank 14 and pumps secondary sludge directly from clarifier mean 24 to the biological treatment tank 14 as a function of the hydraulic and organic conditions in the system in the same manner as previously described.

It will also be understood that the word "tank" as used in the specification and claims is intended to cover any suitable means for holding or confining the material being treated, including a reservoir, basin, pond, or the like.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

I claim:

1. A sewage treatment apparatus comprising a biological treatment tank, means for conducting sewage to be treated to said treatment tank, to provide a mixed liquor in said treatment tank, clarifier means communicating with and adapted to receive mixed liquor from said treatment tank whereby to separate said mixed liquor into secondary sludge and into an effluent, mean for conducting secondary sludge to said treatment tank, means for sensing the hydraulic flow rate in said apparatus and for providing a first signal which is a function of said hydraulic flow rate, means for sensing an organic concentration of material flowing in said apparatus and for providing a second signal which is a function of said organic concentration, means for combining said first and second signals to provide a resultant signal which is a function of both the sensed hydraulic flow rate and of the sensed organic concentration, and means responsive to said resultant signal for regulating the flow of secondary sludge to said treatment tank as a function of said resultant signal.

PO-1050
(5/69)

UNITED STATES PATENT OFFICE
CERTIFICATE OF CORRECTION

Patent No. 3,596,767          Dated August 3, 1971

Inventor(s)          Ronald L. Antonie

It is certified that error appears in the above-identified patent and that said Letters Patent are hereby corrected as shown below:

| | |
|---|---|
| Column 1, line 56 | "waster" should read – waste – |
| Column 1, line 66 | "an sewage" should read – and sewage – |
| Column 2, line 43 | "finger" should read – figure – |
| Column 3, line 5 | "diameter" should read – diameters – |
| Column 3, line 24 | "indicted" should read – indicated – |
| Column 3, line 43 | "Piotrowski; 3,325,134–Mc-" should read – Piotrowski; 3,325,154–Mc- – |
| Column 3, line 48 | "U.S. Pat. Nos. 3,348,829–" should read – U.S. Pat. Nos. 1,343,797– – |
| Column 3, line 74 | "in an" should read – in any – |
| Column 4, line 3 | "the is possible" should read – the various possible – "location" should read – locations – |
| Column 4, line 7 | "and adds" should read – and adds the signals from – |
| Column 4, line 39 | first sentence indented |
| Column 4, line 41 | "by Fisher" should read – by Fischer – |
| Column 4, line 45 | "meter meter" should read – meter – |
| Column 4, line 68 | "which measures which measures" should read – which measures – |

PO-1050 (5/69)

UNITED STATES PATENT OFFICE
CERTIFICATE OF CORRECTION

Patent No. 3,596,767      Dated August 3, 1971

Inventor(s) Ronald L. Antonie      Page 2

It is certified that error appears in the above-identified patent and that said Letters Patent are hereby corrected as shown below:

| | |
|---|---|
| Column 5, line 5 | "(157A" should read – C157A – |
| Column 5, line 23 | "1428 -6" should read – 1428-10-6 – |
| Column 5, line 44 | "bacterial" should read – bacteria – |
| Column 5, line 47 | "therein the further ab-" should read – therein to further ad- – |
| Column 5, line 55 | "n" should read – in – |
| Column 5, line 75 | "insure" should read – insures – |
| Column 6, line 21 | "other band" should read – other hand – |
| Column 6, line 24 | "nd" should read – and – |
| Column 6, line 26 | "sued" should read – used – |
| Column 6, line 63 | "mean" should read – means – |
| Column 7, line 8, CLAIM 1 | "mean" should read – means – |

Signed and sealed this 22nd day of February 1972.

(SEAL)
Attest:

EDWARD M. FLETCHER, JR.
Attesting Officer

ROBERT GOTTSCHALK
Commissioner of Patents